Oct. 11, 1966 G. F. LIPSEY 3,278,883
COMBINED GASKET AND GROUNDING DEVICE FOR BUSHINGS
Filed March 17, 1965
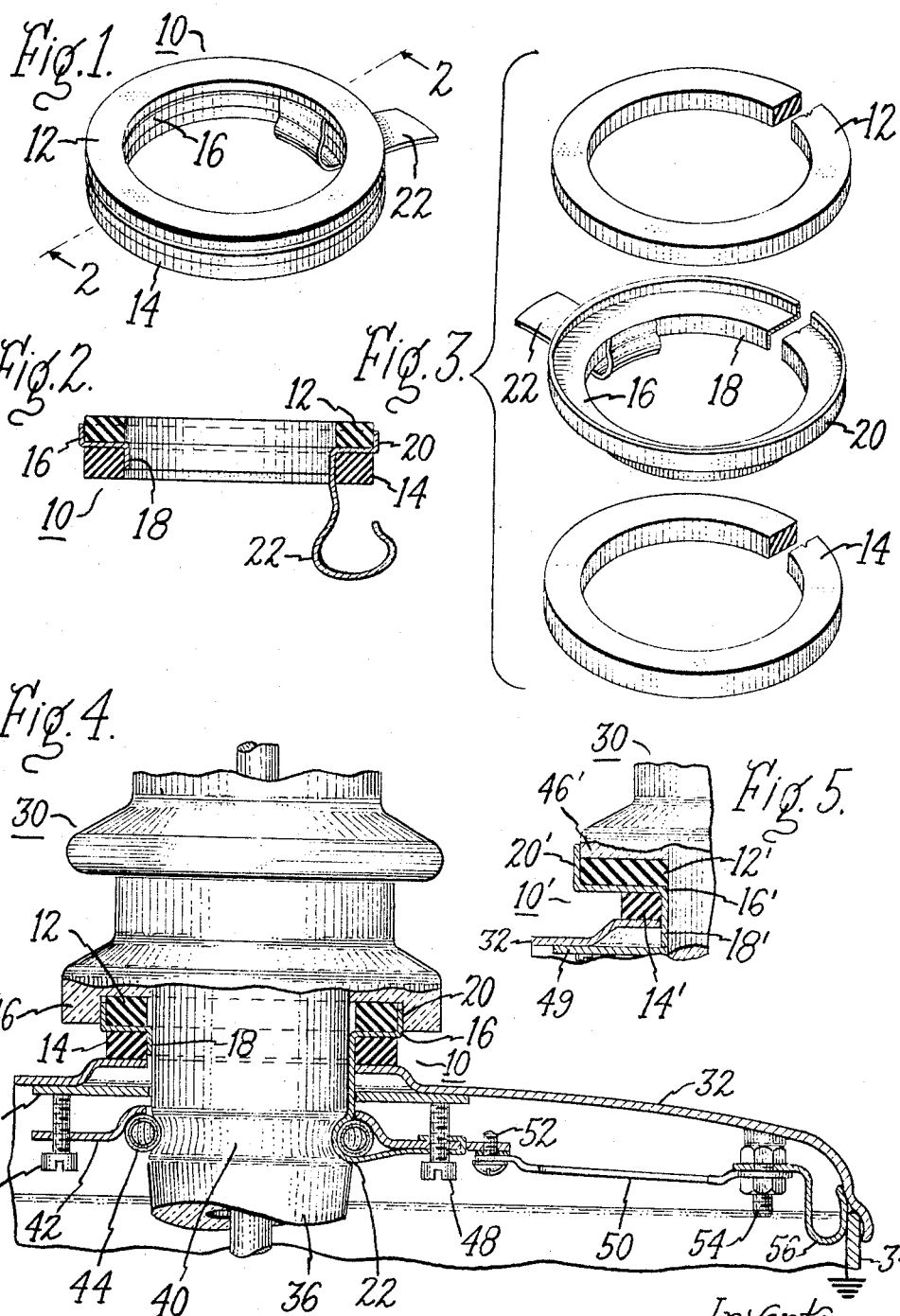
Inventor,
Goldner F. Lipsey,
by Francis K. Doyle
His Attorney.

United States Patent Office 3,278,883
Patented Oct. 11, 1966

3,278,883
COMBINED GASKET AND GROUNDING DEVICE FOR BUSHINGS
Goldner F. Lipsey, Pittsfield, Mass., assignor to General Electric Company, a corporation of New York
Filed Mar. 17, 1965, Ser. No. 440,492
2 Claims. (Cl. 339—14)

This invention relates to bushings and, more particularly, to a combination gasket and grounding device for bushings.

As is well known to those skilled in the bushing art, bushings are used to carry an electrical conductor through the wall or cover of an electrical apparatus. An example is the high voltage bushing on the cover of an electrical transformer. In general, the outer surface of the cover or wall to which the bushing is connected is at ground potential. However, in many instances, particularly for outdoor use, the cover or wall is coated with an insulating material such as paint or plastic resin. This insulation is utilized to prevent contact with ground by animals, who may touch live terminals, as well as preventing corrosion of the metallic surface. The bushings are usually attached to the wall or cover by means of gaskets to properly seal the opening through which the bushing extends. Thus, in many installations the bushing is not grounded at its entrance into the electrical apparatus.

As will be understood, when the exterior of the bushing becomes wet or contaminated, arcing occurs across its surface. Where the bushing is not grounded this arcing tends to continue across the surface of the insulated wall or cover. This arcing over the wall or cover causes erosion of the insulation thereon and eventually leads to corrosion of the metallic surface after sufficient erosion of the insulated coating. It is well known that when the bushing is grounded to the wall or cover the arcing from the bushing is grounded and prevents damage to the insulated surfaces of such wall or cover.

In many types of bushings a metal mounting member is provided, with the mounting member being attached to a ceramic-to-metal seal or bond formed on the bushing. See, for example, Patent No. 3,020,182. This provides an adequate ground to the bushing but is a relatively expensive method in both labor and material. Other bushings are mounted on the wall or cover of an electrical apparatus by inserting a small diameter portion of the bushing through an opening in such wall or cover, the bushing then being secured by a securing means on the inner portion of the bushing. In this type of bushing many devices have been tried to provide adequate grounding of the bushing. In some instances ceramic-to-metal bonds have been provided, connected to the edge of the opening in the wall or cover. While successful, this method is considered too expensive. Also, conductive gaskets have been tried to alleviate this problem but such devices have been only partially successful.

It is, therefore, one object of this invention to provide a grounding device for a bushing.

A further object of this invention is to provide an internally secured bushing with an exterior grounding means.

A still further object of this invention is to provide a combined gasket and grounding device for a bushing.

Yet another object of this invention is to provide a bushing having an exterior gasket and grounding device where the grounding means is adapted to be connected to the interior of the wall or cover mounting the bushing.

In carrying out this invention in one form, a combination gasket and grounding means is provided. The combination gasket and grounding means comprises a pair of ring-shaped gasket members having a conductive ring-shaped member sandwiched therebetween. A conductive grounding strap extends from the inner edge of the conductive member below the lower gasket member. This grounding strap is adapted for connection to a grounded portion of an electrical apparatus.

The invention desired to be protected will be clearly pointed out and distinctly claimed in the claims appended hereto. However, it is believed that this invention and the manner in which its various objects and advantages are obtained, as well as other objects and advantages thereof, will be more fully understood from the following detailed description of preferred embodiments thereof. The description will be especially understood when considered in the light of the accompanying drawing, in which:

FIGURE 1 is a perspective view of a preferred form of the combined gasket and grounding device of this invention;

FIGURE 2 is a sectional view taken on the line 2—2 of FIG. 1;

FIGURE 3 is an exploded perspective view of the combined gasket and grounding device shown in FIG. 1;

FIGURE 4 is a partial sectional view showing the combined gasket and grounding device of FIG. 1 as applied to a bushing secured to the cover of an electrical apparatus; and FIGURE 5 is a partial sectional view similar to FIG. 4 showing a modified form of the invention.

Reference will now be made to the drawing in which like parts will be indicated by like numerals throughout the various views thereof. Referring first to FIG. 1, there is shown a perspective view of a prefered form of the combined gasket and grounding device of this invention. As shown in FIG. 1, the combined gasket and grounding device 10 comprises an upper ring-shaped gasket member 12 and a lower ring-shaped gasket member 14. Sandwiched between gasket member 12 and member 14 is a ring-shaped conductive disk 16. As can be seen in FIGS. 2 and 3, a disk 16 is shaped to provide an inner, lower rim 18 which fits within the lower gasket 14. Disk 16 also has an outer, upper rim 20 which surrounds the upper gasket 12. The relation of gaskets 12 and 14 and the rims 18 and 20 is clearly apparent from the sectional view of FIG. 2. As is apparent from this view and also from a consideration of the exploded perspective view of FIG. 3, it can be seen that the conductive disk 16 is formed with the rim 20 such that the upper gasket will fit snugly within the rim 20. The lower gasket 14 in a similar manner fits snugly about the lower rim member 18. This provides a sandwich construction, particularly shown in FIG. 2, in which gasket members 12 and 14, which are preferably of a resilient insulating material, provide the desired sealing, while the conductive disk member 16 provides the desired conductive grounding means.

Depending from the lower rim 18 of conductive disk 16 is a conductive strap member 22. As will be apparent to those skilled in this art, the strap member 22 may be connected to a grounded portion of a surface to which the combined gasket and grounding device 10 is attached. The strap member 22 may be formed as an integral part of the lower rim 18 or it may be welded, brazed, or otherwise electrically connected thereto.

Referring now to FIG. 4 there is shown one application of the combined gasket and grounding device 10 in connection with a bushing device 30. As shown in FIG. 4, the bushing device 30 is secured to cover 32 which is mounted on a tank 34. As will be understood cover 32 and tank 34 may be, for example, the casing of an electrical transformer.

The bushing 30 is provided with a reduced portion 36 as shown, the reduced portion 36 being inserted through an opening 38 in the cover member 32. A groove 40 is provided in the reduced portion 36 and a connecting member 42 is secured to reduced portion 36 by means of the spring connector 44 mounted in the groove 40. As can be seen from FIG. 4, the combined gasket and grounding device 10 is mounted on the reduced portion 36 of bushing 30 fitting beneath the lower petticoat 46 of bushing 30. As will be understood, the bushing 30 may be pulled tightly against cover 32, compressing the combined gasket and grounding device 10 between the bushing 30 and cover 32 when the screw members 48 are tightened against cover 32. As shown, a plate member 49 may be provided between cover 32 and screw members 48 to provide a level surface for screw members 48 and protect the cover 32. In this manner, bushing 30 is securely attached to cover 32 and the combined gasket and grounding device 10 is compressed therebetween to seal the opening 38 about the bushing 30.

As will be understood, when the outer surface of cover 32 is coated with an insulating material the bushing 30 will not be adequately grounded by gaskets and, therefore, arcing across bushing 30 will extend over the surface of cover 32. To prevent such arcing the combined gasket and grounding device 10 may be used. As can be seen from FIG. 4, the conductive disk 16 has its outer rim 20 in firm contact with the lower petticoat 46 of bushing 30. The inner rim 18 surrounds the reduced portion 36 of bushing 30 and the grounding strap 22 extends through opening 38 around spring member 44 and may be connected to securing member 42 in the manner shown. To more securely ground securing member 42 an additional grounding member 50 may be provided which is bolted to securing member 42 by means of bolt 52. The opposite end of member 50 is connected to a stud member 54. Also connected to stud 54 is grounding member 56 which is shown as designed to make electrical contact with wall 34 when cover 32 is secured thereto. Of course, it will be understood that grounding strap 22 may be connected in any manner to an interior grounding portion of the cover 32 or tank 34 as desired. From the above it will be apparent that by means of the combined gasket and grounding device 10 a grounding means may be provided through an opening in a cover or wall while providing desired sealing of such opening.

In FIG. 5 a modified form of the combined gasket and grounding device is shown. In this figure the combined device is indicated as 10′ and is provided with an upper gasket member 12′ and a lower gasket member 14′. A conductive disk member 16′ is provided sandwiched between gaskets 12′ and 14′. Disk 16′ has a lower rim 18′ snugly fitting within gasket 14′ and has an outer upper rim member 20′ within which is snugly fit the upper gasket 12′. As shown, upper rim 20′ extends above the upper gasket 12′. As can be seen from FIG. 5, the outer rim member 20′ is designed to snugly receive the outer petticoat 46′ of a bushing 30 such that the outer rim 20′ will provide a more secure ground connection for the exterior portion of bushing 30.

While there has been shown and described the present preferred embodiment of this invention and a desired modification thereof, it will be apparent to those skilled in this art that many changes may be made in constructional details without departing from the spirit and scope of this invention. Thus all such modifications are deemed to be included in this invention as are defined in the appended claims.

What is claimed as new and which it is desired to secure by Letters Patent of the United States is:

1. A combination gasket and grounding device for bushings comprising, in combination,
   (1) a conductive disk member,
      (a) an inner flange extending from the side of said conductive disk and forming a large central opening therethrough,
      (b) an outer flange formed on the outer edge of said disk and extending from the opposite side of said disk,
   (2) a pair of ring-shaped gasket members,
      (a) one of said gasket members positioned on said one side of said disk and surrounding said inner flange,
      (b) the other of said gasket members being positioned on said other side of said disk in line with said one gasket and within said outer flange,
   (3) and a conductive grounding strap electrically connected to a portion of said inner flange and extending therefrom beyond said one gasket member,
      (a) said conductive grounding strap adapted to be electrically connected to a ground portion of an electrical apparatus.

2. A combination gasket and grounding device as claimed in claim 1 in which said conductive grounding strap is integral with said inner flange.

References Cited by the Examiner

UNITED STATES PATENTS

| 2,407,076 | 9/1946 | Harkness | 174—35 |
| 2,728,810 | 12/1955 | Ziehr | 174—75 |
| 2,802,176 | 8/1957 | Anderson et al. | 174—143 X |
| 2,858,156 | 10/1958 | Wootton | 277—166 X |

FOREIGN PATENTS

Ad. 17,647  1914  Great Britain.

LARAMIE E. ASKIN, *Primary Examiner.*